(12) United States Patent
Bansal et al.

(10) Patent No.: US 8,147,936 B2
(45) Date of Patent: Apr. 3, 2012

(54) COMPOSITE MEMBRANE FOR CHEMICAL AND BIOLOGICAL PROTECTION

(75) Inventors: Vishal Bansal, Overland Park, KS (US); Yit-Hong Tee, Lee's Summit, MO (US); Reena Srivastava, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 12/482,281

(22) Filed: Jun. 10, 2009

(65) Prior Publication Data

US 2010/0316819 A1 Dec. 16, 2010

(51) Int. Cl.
*B32B 27/08* (2006.01)
*A41D 13/00* (2006.01)

(52) U.S. Cl. .................. 428/35.7; 2/457; 428/212
(58) Field of Classification Search .................. 442/394, 442/397; 2/457
See application file for complete search history.

(56) References Cited

U.S. PATENT DOCUMENTS

| | | | |
|---|---|---|---|
| 4,454,191 A | 6/1984 | von Blucher et al. |
| 4,515,761 A | 5/1985 | Plotzker |
| 4,554,198 A | 11/1985 | von Blucher et al. |
| 4,872,220 A | 10/1989 | Haruvy et al. |
| 4,943,475 A | 7/1990 | Baker et al. |
| 4,954,392 A | 9/1990 | Goldberg |
| 4,981,738 A | 1/1991 | Farnworth et al. |
| 5,017,424 A | 5/1991 | Farnworth et al. |
| 5,024,594 A | 6/1991 | Athayde et al. |
| 5,264,276 A | 11/1993 | McGregor et al. |
| 5,273,814 A | 12/1993 | Kelly |
| 5,391,426 A | 2/1995 | Wu |
| 5,397,628 A | 3/1995 | Crawley et al. |
| 5,743,775 A | 4/1998 | Baurmeister |
| 5,824,405 A | 10/1998 | White |
| 6,395,383 B1 | 5/2002 | Maples |
| 6,844,122 B2 | 1/2005 | Haggquist |
| 6,998,155 B2 | 2/2006 | Haggquist et al. |
| 7,247,374 B2 | 7/2007 | Haggquist |
| 7,465,490 B2 | 12/2008 | Von Blucher |
| 2004/0071916 A1 | 4/2004 | Romanowski |
| 2004/0259446 A1 | 12/2004 | Jain et al. |
| 2005/0076541 A1 | 4/2005 | Von Blucher |
| 2007/0049149 A1 | 3/2007 | Ellis |
| 2007/0059504 A1 | 3/2007 | von Blucher |
| 2007/0134486 A1 | 6/2007 | Bansal et al. |
| 2007/0264203 A1 | 11/2007 | Haggquist |

FOREIGN PATENT DOCUMENTS

| | | |
|---|---|---|
| EP | 1433394 A1 | 6/2004 |
| WO | WO03106543 | 12/2003 |
| WO | WO2004030764 | 4/2004 |
| WO | WO2005115549 | 12/2005 |
| WO | WO2005118280 A1 | 12/2005 |
| WO | WO2006124064 | 11/2006 |

OTHER PUBLICATIONS

GB 1008918.3, Great Britain Search Report, Sep. 27, 2010.

*Primary Examiner* — Lynda Salvatore
(74) *Attorney, Agent, or Firm* — Fletcher Yoder PC

(57) ABSTRACT

A system, in certain embodiments, includes a protective membrane having first and second layers. The first layer is air permeable, vapor breathable, and liquid repellant. The second layer is vapor breathable, liquid repellant, and adsorptive of chemical and/or biological agents.

20 Claims, 5 Drawing Sheets

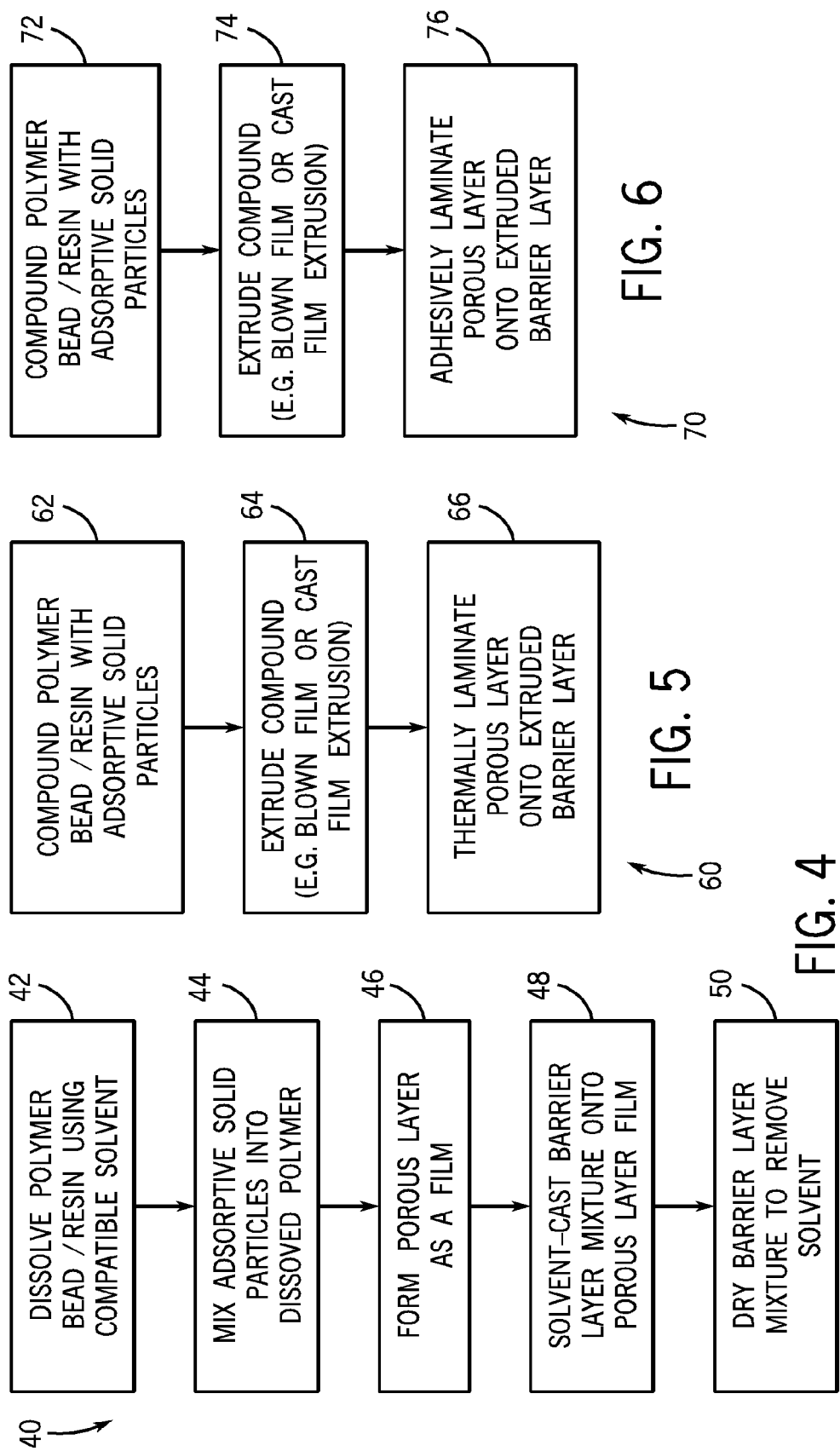

COMPOSITE MEMBRANE FOR CHEMICAL AND BIOLOGICAL PROTECTION

BACKGROUND OF THE INVENTION

The subject matter disclosed herein relates to a protective membrane. More specifically, disclosed embodiments of the invention relate to composite membranes which provide chemical and biological protection.

It is often desirable for people in combat areas, such as soldiers in war zones, to be protected against chemical and/or biological weapons in addition to being protected from the elements. Accordingly, it may be beneficial for clothing and/or shelters to provide resistance, for example, to rain, chemicals, and biological agents. Unfortunately, existing products do not provide adequate protection or are inappropriate for use on a regular basis.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a protective membrane having a first layer that is air permeable, vapor breathable, and liquid repellant. The protective membrane also includes a second layer that is vapor breathable, liquid repellant, and adsorptive of chemical and/or biological agents.

In a second embodiment, a material composition includes a porous layer that is air permeable, vapor breathable, and liquid repellant. The material composition also includes a barrier layer that is vapor breathable, liquid repellant, and adsorptive of chemical and/or biological agents.

In a third embodiment, a system includes a protective fabric made with a multi-layer membrane. The multi-layer membrane includes a first layer that is air permeable, vapor breathable, and liquid repellant. The multi-layer membrane includes a second layer that is vapor breathable, liquid repellant, and adsorptive of chemical and/or biological agents. Furthermore, the first and second layers have a moisture vapor transmission rate of at least greater than or equal to approximately 10,000 g/m2/day, the first and second layers have a hydrostatic Mullen value of at least greater than or equal to approximately 10 psi, and the first layer has an air permeability rate of at least greater than or equal to approximately 0.02 cfm.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a flow chart of an embodiment of a process for forming the composite membrane of FIG. 2;

FIG. 5 is a flow chart of an embodiment of a process for forming the composite membrane of FIG. 2;

FIG. 6 is a flow chart of an embodiment of a process for forming the composite membrane of FIG. 3;

DETAILED DESCRIPTION OF THE INVENTION

Figure 1:
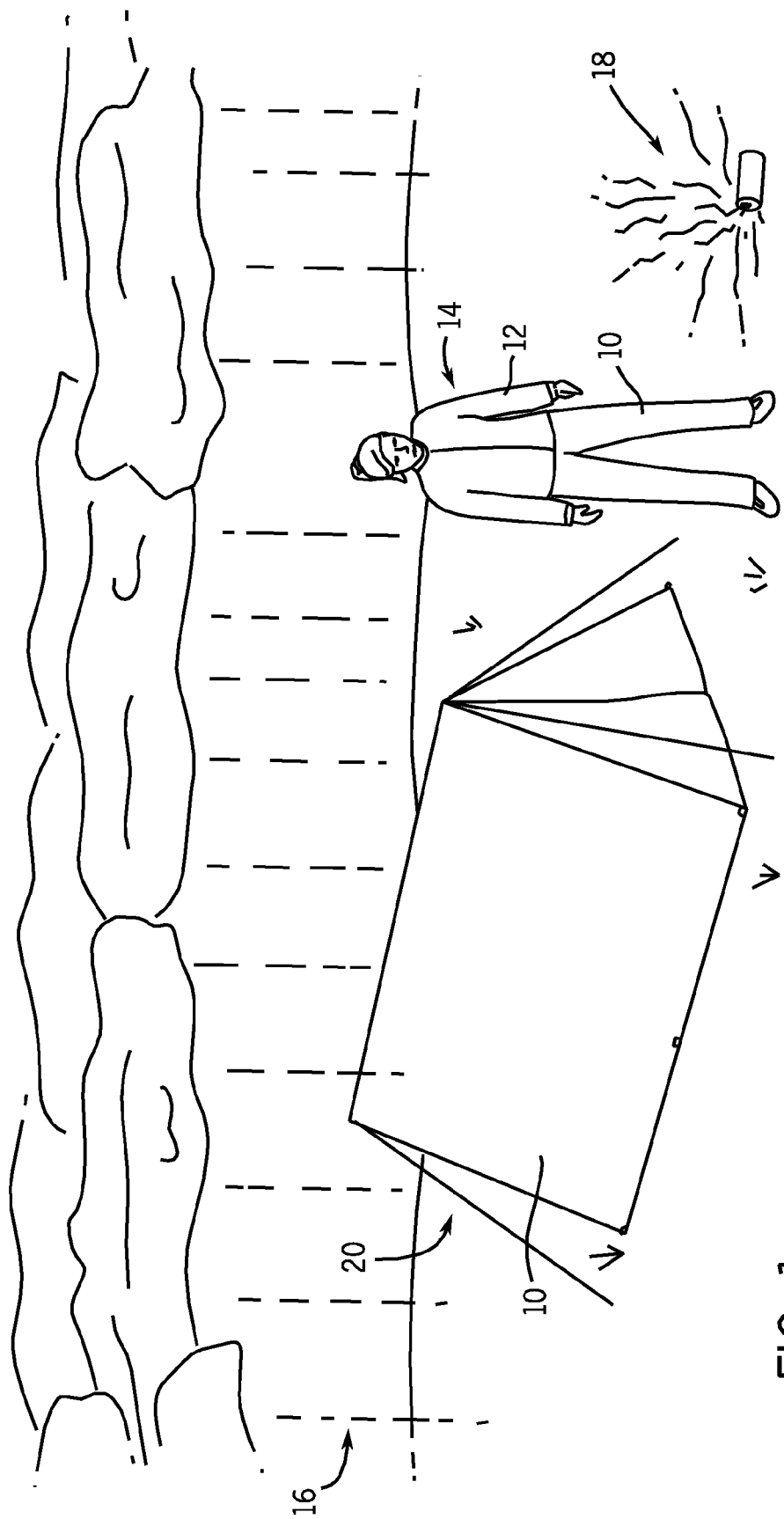
FIG. 1 is a schematic diagram of possible applications for a composite membrane in accordance with embodiments of the present invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, the disclosed embodiments may include a composite membrane having a plurality of layers, each having different characteristics. For example, the characteristics may include air permeability, breathability, liquid repellency, and adsorptiveness. By further example, characteristics may include chemical and/or biological resistance in combination with water (e.g., rain) repellency, air permeability, and breathability. The composite membrane may be used in clothing, shelters, and other equipment benefitting from such characteristics.

These characteristics may be defined as follows. Air permeability may be defined as a rate of air passing through the layer, e.g., in units of cubic feet per minute (cfm), which may be measured using ASTM D737 (Standard Test Method for Air Permeability of Textile Fabrics). Breathability may be defined as a rate of vapor (e.g., water vapor) passing through the layer. For example, breathability may be measured in units of grams of water vapor per square meter of fabric per 24 hour period (g/m²/day), often abbreviated to just "g", which may be measured using an inverted cup method set forth in JIS L1099-B (Testing Methods for Water Vapor Permeability of Textiles). As discussed below, breathability may also be described as vapor permeability or vapor breathability, wherein the vapor may include water vapor or another gas phase of a liquid. Thus, these terms may be used interchangeably to refer to a vapor transmission rate or capability of the layers. Liquid repellency may be defined as resistance to flow of a liquid (e.g., water flow) through the layers, e.g., an amount of pressure opposing liquid flow through the layers. For example, the liquid repellency or liquid resistance may be measured with a hydrostatic Mullen value in pounds per square inch (psi), as measured using ASTM D751 (Standard Test Methods for Coated Fabrics). By further example, liquid resistance may be measured as an amount of liquid (e.g., water) that can be suspended above the layers before the liquid seeps through. Adsorptiveness may be defined as a capability to accumulate a gas or liquid solute on a surface of a substance, thereby forming a film of molecules or atoms (i.e., the adsorbate). In the embodiments discussed below, the adsorptiveness may refer to the capability of the layers to accumulate a chemical or biological agent (e.g., chemical/biological adsorptiveness), thereby providing a degree of chemical/biological protection or resistance.

In one embodiment, the composite membrane may include at least an inner layer and an outer layer. The outer layer may be a porous, breathable, liquid repellant layer, such as expanded polytetrafluoroethylene. The inner layer may be a breathable polymer with solid, adsorptive particles therein to adsorb chemical and/or biological agents. The breathable polymer layer may include, for example, polyurethane, copolyether-polyamide, or copolyether-polyester. In addition, the solid, adsorptive particles may include activated carbon, zeolite, metal oxides, such as silica or titania, or a combination thereof. The composite membrane may be formed via a solvent-coating process in which the adsorptive particles are mixed in with the breathable polymer dissolved in a solvent, and the mixture is coated onto the outer layer. The composite membrane may also be formed via thermal or adhesive lamination of the outer layer and the barrier layer.

Fabrics coated with the presently-disclosed composite membrane may be advantageous over fabrics impregnated with activated carbon for many reasons. For example, carbon-impregnated fabrics may not be sufficiently stable to enable multiple uses with washing. In addition, the distribution of activated carbon into fabric may be non-uniform, thereby generating weak spots through which chemicals and/or biological agents may penetrate. Furthermore, other materials may be more resistant to chemicals and/or biological agents but may not be breathable, thereby preventing moisture from being wicked away from the skin. This behavior makes it impractical to wear the material for an extended period of time. Due to the air permeability, breathability, chemical and/or biological agent resistance, and other characteristics of the present composite membrane, everyday use of fabrics coated with the membrane may be possible and even practical.

FIG. 1 illustrates exemplary uses for embodiments of a composite membrane 10 as described in the present disclosure. For example, the membrane 10 may be applied to clothing 12 to provide two or more barrier layers. The composite membrane 10 may protect a wearer 14 from rain 16 via a water-repellant outer layer, as described in more detail below. In addition, the water-repellant outer layer, in conjunction with an adsorptive inner layer, may serve as a barrier to chemical and/or biological agents 18, such as sarin, mustard gas, and nerve gas. Accordingly, the composite membrane 10 may be especially suited for use on clothing in combat areas. For example, a military uniform, including fatigues, boots, gloves, jackets, hoods, and so forth, may be coated with the composite membrane 10. In addition, shelters, such as tents 20, may also be coated with the composite membrane 10 to block out the chemical and/or biological agents 18 and precipitation, such as the rain 16. The composite membrane 10 may have additional applications, such as, for example, coating soft tops on vehicles (e.g., Jeeps, Hummers, water craft, etc.). The body of fabric water craft (e.g., inflatable rafts) may also be coated with the composite membrane 10.

Figure 2:
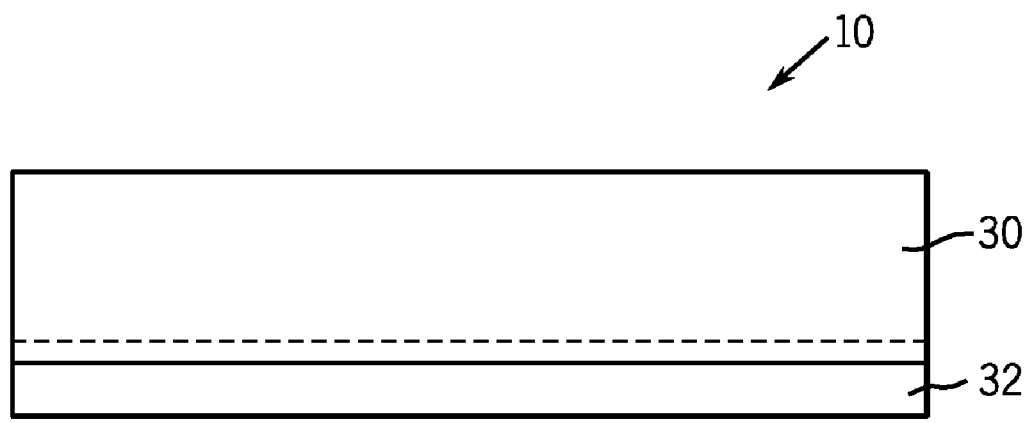
FIG. 2 is a cross-sectional view of an embodiment of the composite membrane of FIG. 1.

FIG. 2 illustrates an exemplary embodiment of the composite membrane 10. In the illustrated embodiment, the composite membrane 10 includes a porous layer 30 and a barrier layer 32. In application to fabric or other surfaces (FIG. 1), the layer applied closest to the surface may be considered the "inner" layer, whereas the other layer may be considered the "outer" layer. Either the porous layer 30 or the barrier layer 32 may be the inner layer, with the other layer 30 or 32 being the outer layer. The porous layer 30 may be composed of a material exhibiting breathability, air permeability, and liquid repellency. In other words, the porous layer 30 may generally block liquids, such as water, from penetrating the surface of the layer 30 (i.e., liquid repellency), while still allowing air and water vapor to permeate through the layer 30 (i.e., air permeability and breathability, respectively). This enables the porous layer 30 to repel rain, for example, without trapping moisture, such as sweat, inside the membrane 10. Materials exhibiting breathability, air permeability, and liquid repellency may include, for example, fluoropolymers, sulfonated polymers, polyamides, polyimides, cellulosic polymers, expanded polytetrafluoroethylene (ePTFE), etc.

The barrier layer 32 may be porous or monolithic, as described in more detail below, and may be an organic polymer with solid, adsorptive particles stabilized therein. The polymer component may include, for example, polyurethane (PU), copolyether-polyamide, or copolyether-polyester. Exemplary adsorptive solid particles may include, for example, activated carbon, zeolite, and/or metal oxides, such as silica ($SiO_2$) or titania ($TiO_2$). The adsorptive particles may trap chemical and/or biological agents in the barrier layer 32 by accumulating the liquid or gaseous particles of the agents on the surface of the adsorptive particles via adhesion. Agents adsorbed in the barrier layer 32 may include, for example, sarin, mustard gas, and nerve gas. In addition, in the embodiment of the composite membrane 10 illustrated in FIG. 2, the porous layer 30 and the barrier layer 32 may be bonded together via, for example, solvent casting or thermal adhesion, as described in more detail below.

Figure 3:
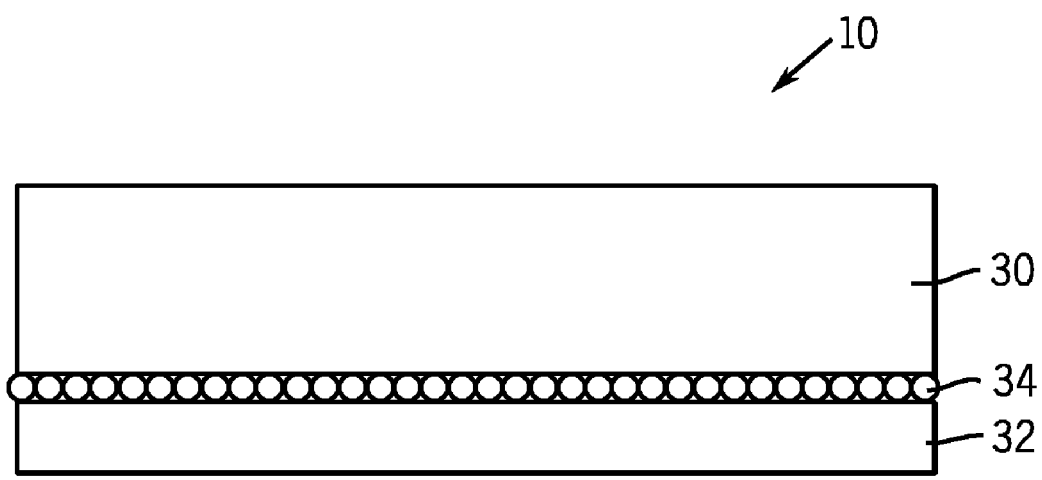
FIG. 3 a cross-sectional view of another embodiment of the composite membrane of FIG. 1.

FIG. 3 illustrates another embodiment of the composite membrane 10. In the illustrated embodiment, the composite membrane 10 includes the porous layer 30 and the barrier layer 32 adhered together via an adhesive layer 34. The adhesive layer 34 may be, for example, a breathable thin-film adhesive, such as Platamid 1937, available from Arkema Inc., Philadelphia, Pa.; Witcoflex 2828, available from Baxenden Chemicals Ltd., Worcestershire, UK; and TL 5402, available from H.B. Fuller Company, St. Paul, Minn. The composite membrane 10 may also include additional layers, such as, for example, a fabric layer including but not limited to knitted fabric, non-woven fabric, and woven fabric.

FIGS. 4 and 5 are flow charts of embodiments of processes for forming the composite membrane 10 of FIG. 2. For example, as illustrated in FIG. 2, the porous layer 30 and the barrier layer 32 may be bonded together chemically or thermally. FIG. 4 illustrates an exemplary solvent-based coating process 40 by which the composite membrane 10 may be formed. The polymer component of the barrier layer 32 may first be dissolved in a compatible solvent, such as toluene, methyl ethyl ketone, hexafluoroisopropanol, cresol, etc. (block 42). The adsorptive particles may be mixed in with the dissolved polymer in the solvent (block 44). In addition to the preparation of the barrier layer 32, the porous layer 30 may be formed into a thin film, for example, via blown film extrusion, cast film extrusion, or any other suitable method (bock 46). Blown film extrusion involves blowing air into a tube-shaped extrusion of a polymer film. The tube-shaped extrusion may be formed by melting the polymer and forcing the molten polymer through an annular slit. The air expands the polymer film like a balloon, which is then solidified via air cooling. The polymer film may be flattened and cut to form two sheets of the thin polymer film. In cast film extrusion, molten polymer may be forced through a flat slit onto a chilled surface, where the polymer cools in the form of a sheet of thin film.

The barrier layer 32, in the form of a dissolved polymer/adsorptive particle mixture in solvent, may then be solvent-cast onto the porous layer 30 (block 48). That is, the barrier layer 32 in solution may be spread evenly over the thin film of the porous layer 30. The barrier layer 32 may then be dried, for example, via indirect heating, radiation, or air-stream drying, to remove the solvent (block 50). Upon removing the solvent, the barrier layer 32 adheres to the porous layer 30, thereby forming the composite membrane 10 of FIG. 2.

FIG. 5 illustrates an exemplary thermal lamination process 60 by which the composite membrane 10 of FIG. 2 may also be formed. In the illustrated embodiment, the barrier layer 32 may be formed, for example, by compounding beads or a resin of the polymer component with the adsorptive solid particles (block 62). That is, the polymer used in forming the barrier layer 32 may initially be in a solid state, in the form of beads or a solid resin. The solid polymer may be mixed with the solid adsorptive particles to form a mixture of the polymer and adsorptive particle components of the barrier layer 32, which is melted during or after the mixing process. The molten mixture may then be extruded, for example, via blown film or cast film extrusion, to create the barrier layer 32 (block 64). As in the coating process 40 described with respect to FIG. 4, the porous layer 30 may be formed as a thin film independently of the barrier layer 32. The extruded barrier layer 32 may then be thermally laminated with the porous layer 30 by heating the layers 30 and 32 and compressing them together, thereby forming the composite membrane 10 of FIG. 2 (block 66).

Similarly, FIG. 6 illustrates an exemplary adhesive lamination process 70 by which the composite membrane 10 of FIG. 3 may be formed. Again, the barrier layer 32 may be formed, for example, by compounding beads or a resin of the polymer component with the adsorptive solid particles (block 72), and the porous layer 30 may be formed as a thin film as described with respect to FIG. 4. The barrier layer 32 may then be extruded, for example, via blown film or cast film extrusion (block 74). The extruded barrier layer 32 may then be adhesively laminated with the porous layer 30 via the adhesive layer 34, thereby forming the composite membrane 10 of FIG. 3 (block 76). That is, the layers 30 and 32 may be adhered, or glued, together via the adhesive layer 34. The adhesive layer 34 may be Platamid 1937, available from Arkema Inc., Philadelphia, Pa.; Witcoflex 2828, available from Baxenden Chemicals Ltd., Worcestershire, UK; and TL 5402, available from H.B. Fuller Company, St. Paul, Minn. The adhesive layer 34 may be applied to the porous layer 30, the barrier layer 32, or both layers 30 and 32. The layers 30 and 32 may then be placed together, and pressure may be applied to ensure adhesion of both layers 30 and 32 with the adhesive layer 34.

Figure 7:
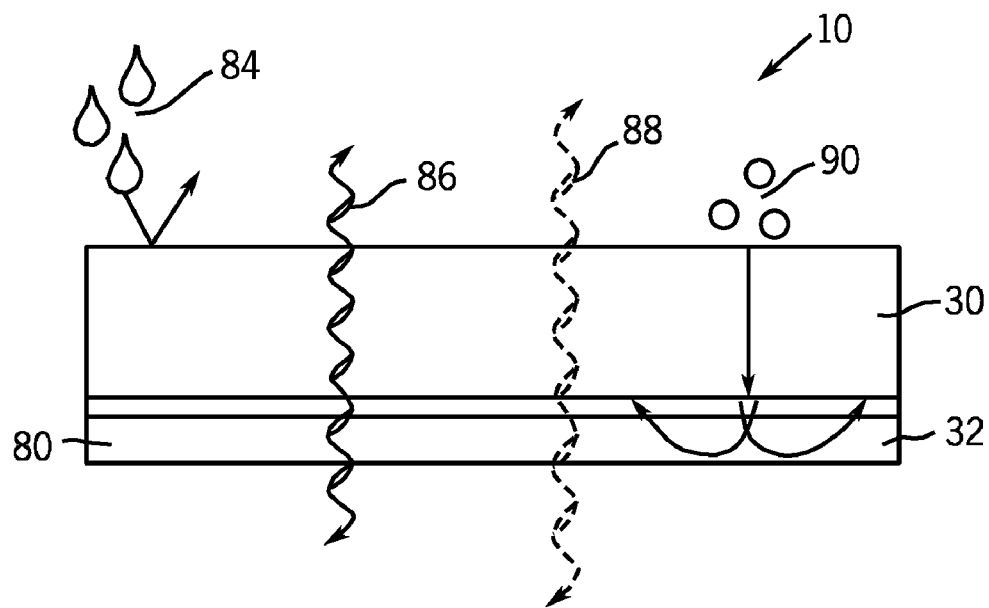
FIG. 7 is a cross-sectional diagram illustrating properties of an embodiment of the composite membrane of FIG. 2.
Figure 8:
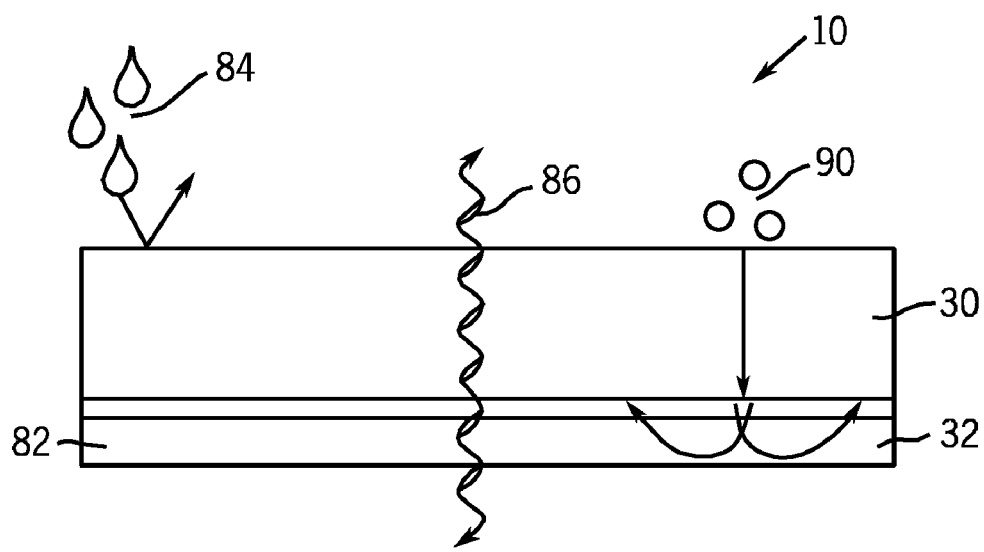
FIG. 8 is a cross-sectional diagram illustrating properties of another embodiment of the composite membrane of FIG. 2.
Figure 9:
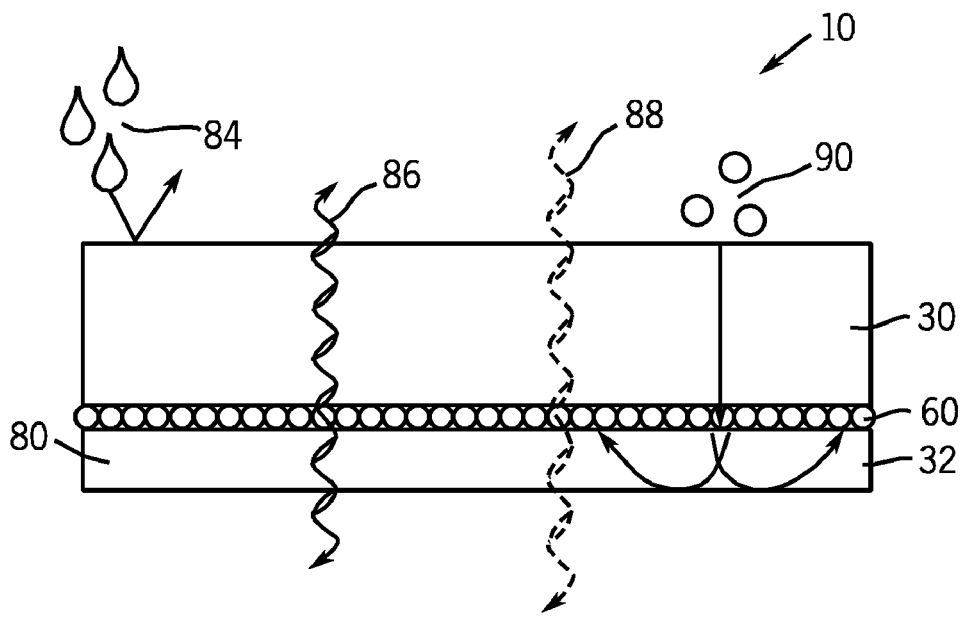
FIG. 9 is a cross-sectional diagram illustrating properties of an embodiment of the composite membrane of FIG. 3.
Figure 10:
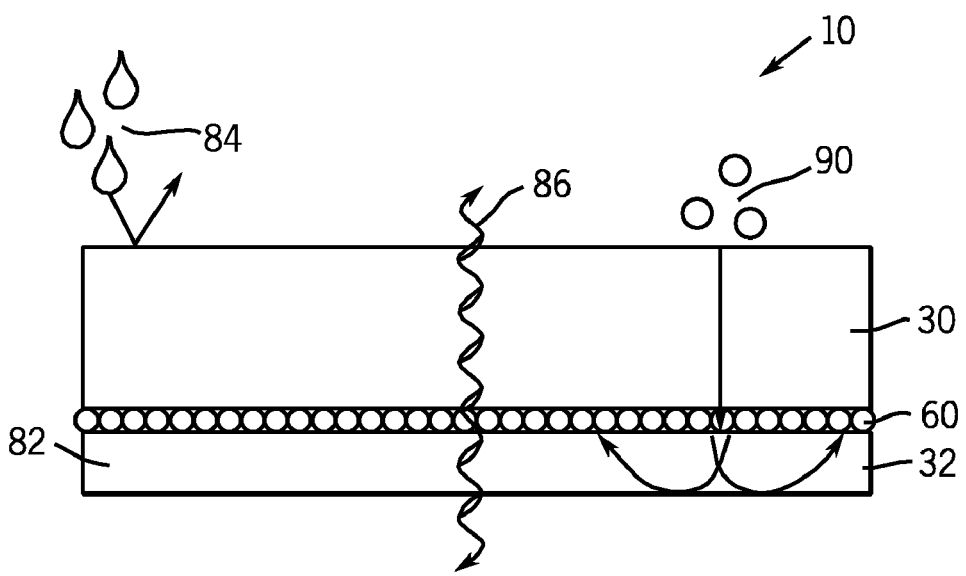
FIG. 10 is a cross-sectional diagram illustrating properties of another embodiment of the composite membrane of FIG. 3.

As noted above, the barrier layer 32 may be porous or monolithic, wherein the porous layer 30 may have air permeability ranging from approximately 0.10 to 0.20 cubic feet per minute (cfm) and the monolithic layer is not air permeable. In certain embodiments, the porous layer 30 may have air permeability of at least greater than approximately 0.05, 0.10, 0.15. 0.20, 0.25, 0.30, 0.40, 0.50, or 0.60 cfm. FIGS. 7-10 illustrate further exemplary embodiments of the composite membrane 10 formed via the solvent-coating process 40 (FIG. 4), the thermal lamination process 60 (FIG. 5), or the adhesive lamination process 70 (FIG. 6). For example, FIG. 7 illustrates an embodiment of the composite membrane 10 prepared using the coating process 40 (FIG. 4) or the thermal adhesive process (FIG. 5) where the barrier layer 32 is a porous layer 80. In FIG. 8, the exemplary composite membrane 10 is prepared using the coating process 40 (FIG. 4) or the thermal adhesive process 60 (FIG. 5) using a monolithic layer 82 as the barrier layer 32. FIG. 9 illustrates an embodiment of the composite membrane 10 in which the adhesive lamination process 70 (FIG. 6) is employed, and the barrier layer 32 is the porous layer 80. Finally, FIG. 10 is an illustration of the exemplary composite membrane 10 where the barrier layer 32 is the monolithic layer 82 and the membrane 10 is formed via the adhesive lamination process 70 (FIG. 6).

Referring generally to FIGS. 7-10, the porous layer 30 may have the same properties/functions regardless of how it is formed. For example, the porous layer 30 may be chemically stable and inert. That is, it may be desirable for the outer porous layer 30 to be unreactive and insoluble so that the layer 30 may not be removed by chemical agents. Additionally, in an exemplary embodiment of the composite membrane 10 in which the porous layer 30 is ePTFE, the layer 30 may be thermally stable up to at least approximately 240° C. for continuous usage. However, some embodiments of the layer 30 may be thermally stable up to at least approximately 150, 200, 250, 300, 350, or 400° C. for continuous usage. Further, the porous layer 30 is generally repellant of liquids 84, such as water. In an exemplary embodiment, the porous layer 30 made of ePTFE may have a hydrostatic Mullen value of greater than approximately 100 psi, as measured using ASTM D751 (Standard Test Methods for Coated Fabrics). The hydrostatic Mullen value is indicative of water resistance, with a value of approximately 10 psi or greater being considered "liquid repellant" for purposes of the present disclosure. Thus, in certain embodiments, the porous layer 30 may have a hydrostatic Mullen value of greater than approximately 10, 20, 30, 40, 50, 60, 70, 80, 90, 100, 110, 120, 130, 140, 150, or greater psi.

In addition, the porous layer 30 may allow moisture 86 and air 88 to permeate therethrough. Again, in an exemplary embodiment in which the porous layer 30 is ePTFE, the layer 30 may have a moisture vapor transmission rate (MVTR) of approximately 40,000-60,000 g/m$^2$/day, as measured using the inverted cup method set forth in JIS L1099-B (Testing Methods for Water Vapor Permeability of Textiles), and an air permeability rate of approximately 0.15-1 cfm, as measured using ASTM D737 (Standard Test Method for Air Permeability of Textile Fabrics). The MVTR may indicate the breathability of a material or film, with a value of no less than 10,000 or 15,000 g/m$^2$/day per JIS L1099-B standard method being considered "breathable" for purposes of the present disclosure. In addition, a material having an air permeability rate of at least 0.02 cfm may be considered "air permeable" for purposes of the present disclosure.

Thus, in certain embodiments, the porous layer 30 (e.g., ePTFE) may have a moisture vapor transmission rate (MVTR) of approximately 10,000 to 100,000 or approximately 15,000 to 90,000, or at least greater than approximately 10,000, 15,000, 20,000, 25,000, 30,000, 35,000, 40,000, 45,000, 50,000, 55,000, 60,000, 65,000, 70,000, or 75,000 g/m$^2$/day, as measured using the inverted cup method set forth in JIS L1099-B (Testing Methods for Water Vapor Permeability of Textiles). Furthermore, the porous layer 30 (e.g., ePTFE) may have an air permeability rate of approximately 0.02 to 5 cfm, or at least greater than approximately 0.02, 0.05, 0.1, 0.2, 0.3, 0.4, 0.5, 0.6, 0.7, 0.8, 0.9, or 1 cfm, as measured using ASTM D737 (Standard Test Method for Air Permeability of Textile Fabrics).

The barrier layer 32 may also have similar properties/functions regardless of how it is formed. For example, regardless of whether the barrier layer 32 is porous (FIGS. 7 and 98)

or monolithic (FIGS. 8 and 10), the barrier layer 32 may be breathable, having an MVTR of approximately 10,000 to 50,000, or at least greater than approximately 10,000, 15,000, 20,000, or 25,000 g/m$^2$/day, as measured using the JIS L1099-B inverted cup method. However, in certain embodiments, the barrier layer 32 may be breathable, having an MVTR of approximately 10,000-22,000 g/m$^2$/day, as measured using the JIS L1099-B inverted cup method. An exemplary monolithic barrier layer 32 may have a hydrostatic Mullen value of greater than approximately 140 psi, as measured using the ASTM D751 standard, whereas the porous barrier layer 32 may have a hydrostatic Mullen value of less than approximately 10 psi. In addition, as illustrated in FIGS. 7 and 9, where the barrier layer 32 is porous, the air 88 may be allowed to permeate therethrough in addition to permeating through the porous layer 30. An exemplary porous barrier layer 32 may have an air permeability rate of greater than approximately 0.5 cfm, as measured using the ASTM D737 standard. In contrast, as illustrated in FIGS. 8 and 10, where the barrier layer 32 is monolithic, it is not air permeable. That is, the air permeability rate is at or near 0 cfm, as measured using the ASTM D737 standard.

In certain embodiments, the porous layer 30 and the barrier layer 32 may have a moisture vapor transmission rate of at least greater than or equal to approximately 10,000 g/m2/day, the porous layer 30 and the barrier layer 32 may have a hydrostatic Mullen value of at least greater than or equal to approximately 10 psi, and the porous layer 30 may have an air permeability rate of at least greater than or equal to approximately 0.02 cfm. In this embodiment, the moisture vapor transmission rate of the porous layer 30 may be greater than the barrier layer 32, the hydrostatic Mullen value of the porous layer 30 may be lesser than the barrier layer 32, and the air permeability rate of the porous layer 30 may be greater than the barrier layer 32. For example, in this embodiment, the moisture vapor transmission rate of the porous layer 30 may be at least approximately 10, 20, 30, 40, 50, 60, 70, 80, 90, or 100 percent greater than the barrier layer 32, the hydrostatic Mullen value of the porous layer 30 may be at least approximately 10, 20, 30, 40, 50, 60, 70, 80, 90, or 100 percent lesser than the barrier layer 32, and the air permeability rate of the porous layer 30 may be at least approximately 10, 20, 30, 40, 50, 60, 70, 80, 90, or 100 percent greater than the barrier layer 32. For example, the air permeability rate of the barrier layer 32 may be approximately 0 cfm.

In addition, the barrier layer 32 may be compatible with a number of common chemicals/solvents. That is, the barrier layer 32 may not dissolve in chemicals/solvents with which it is compatible. An exemplary barrier layer 32 made, for example, of polyurethane (PU), copolyether-polyamide, or copolyether-polyester, may be compatible with at least the chemicals listed in Table 1.

TABLE 1

Sulphuric Acid, 10%
Sodium Hydroxide, 10%
Zinc Chloride, 50%
Water
Boiling Water
Ethanol
Propanol
Butanol
Isooctane
100 octane petro
Kerosene
Benzene
Acetone
Ethylene glycol TABLE 1-continued Methylethyl ketone
Methylene chloride
Trichloroethylene
Perchloroethylene
Freon 11
Freon R 22
Freon R 502

Although the porous layer 30 is not chemically reactive, it may allow chemical and/or biological agents 90 to permeate therethrough. The adsorptive particles in the barrier layer 32 may then adsorb the agents 90 by adhering particles of the agents 90 to the surfaces of the adsorptive particles. As indicated above, such adsorptive particles may include, for example, activated carbon, zeolite, metal oxides, or another suitable adsorptive particle. In an exemplary embodiment, the particles may have a surface area of approximately 1,000-2,000 g/m$^2$, an iodine number of approximately 600-1,000 mg of agent adsorbed per gram of adsorptive material, and a molasses index of approximately 90-200. The iodine number may be defined as the micropore (e.g., 0-2 nm) content of the adsorptive particles, whereas the molasses index may be defined as the macropore (e.g., over 2 nm) content of the adsorptive particles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed:
1. A system, comprising:
a protective membrane, comprising:
a first layer that is air permeable, vapor breathable, and liquid repellant;
a second layer that is vapor breathable, liquid repellant, and adsorptive of chemical and/or biological agents.
2. The system of claim 1, wherein the first layer comprises expanded polytetrafluoroethylene, a fluoropolymer, a sulfonated polymer, a polyamide, a polyimide, a cellulosic polymer, or a combination thereof.
3. The system of claim 1, wherein the second layer comprises polyurethane, copolyether-polyamide, or copolyether-polyester.
4. The system of claim 1, wherein the second layer comprises solid activated carbon particles, solid zeolite particles, solid metal oxide particles, or a combination thereof.
5. The system of claim 1, wherein the first and second layers have a moisture vapor transmission rate of at least greater than or equal to approximately 10,000 g/m$^2$/day, the first and second layers have a hydrostatic Mullen value of at least greater than or equal to approximately 10 psi, and the first layer has an air permeability rate of at least greater than or equal to approximately 0.02 cfm.
6. The system of claim 5, wherein the moisture vapor transmission rate of the first layer is greater than the second layer, the hydrostatic Mullen value of the first layer is lesser than the second layer, and the air permeability rate of the first layer is greater than the second layer.

7. The system of claim 6, wherein the air permeability rate of the second layer is approximately 0 cfm.

8. The system of claim 1, wherein the second layer is porous.

9. The system of claim 1, wherein the second layer is monolithic.

10. The system of claim 1, comprising a woven fabric, a nonwoven fabric, a yarn, or a knitted fabric to which the protective membrane is applied.

11. The system of claim 1, comprising a shelter to which the protective membrane is applied.

12. A material composition, comprising:
a porous layer that is air permeable, vapor breathable, and liquid repellant; and
a barrier layer that is vapor breathable, liquid repellant, and adsorptive of chemical and/or biological agents.

13. The material composition of claim 12, wherein the barrier layer is air permeable.

14. The material composition of claim 12, comprising an adhesive layer between the porous layer and the barrier layer.

15. The material composition of claim 12, wherein the porous layer comprises expanded polytetrafluoroethylene.

16. The material composition of claim 12, wherein the barrier layer comprises polyurethane, copolyether-polyamide, or copolyether-polyester.

17. The material composition of claim 12, wherein the barrier layer comprises solid activated carbon particles, solid zeolite particles, solid metal oxide particles, or a combination thereof.

18. A system, comprising:
a protective fabric made with a multi-layer membrane, comprising:
a first layer that is air permeable, vapor breathable, and liquid repellant;
a second layer that is vapor breathable, liquid repellant, and adsorptive of chemical and/or biological agents, wherein the first and second layers have a moisture vapor transmission rate of at least greater than or equal to approximately 10,000 $g/m^2$/day, the first and second layers have a hydrostatic Mullen value of at least greater than or equal to approximately 10 psi, and the first layer has an air permeability rate of at least greater than or equal to approximately 0.02 cfm.

19. The system of claim 18, comprising an enclosure or an article of clothing having the fabric.

20. The system of claim 18, wherein the moisture vapor transmission rate of the first layer is at least approximately 20 percent greater than the second layer, the hydrostatic Mullen value of the first layer is at least approximately 20 percent lesser than the second layer, and the air permeability rate of the first layer is at least approximately 20 percent greater than the second layer.

* * * * *